Oct. 13, 1936.  J. J. BARTON ET AL  2,057,131
AUTOMATIC KICK-OFF DEVICE
Filed Jan. 6, 1934   3 Sheets-Sheet 1
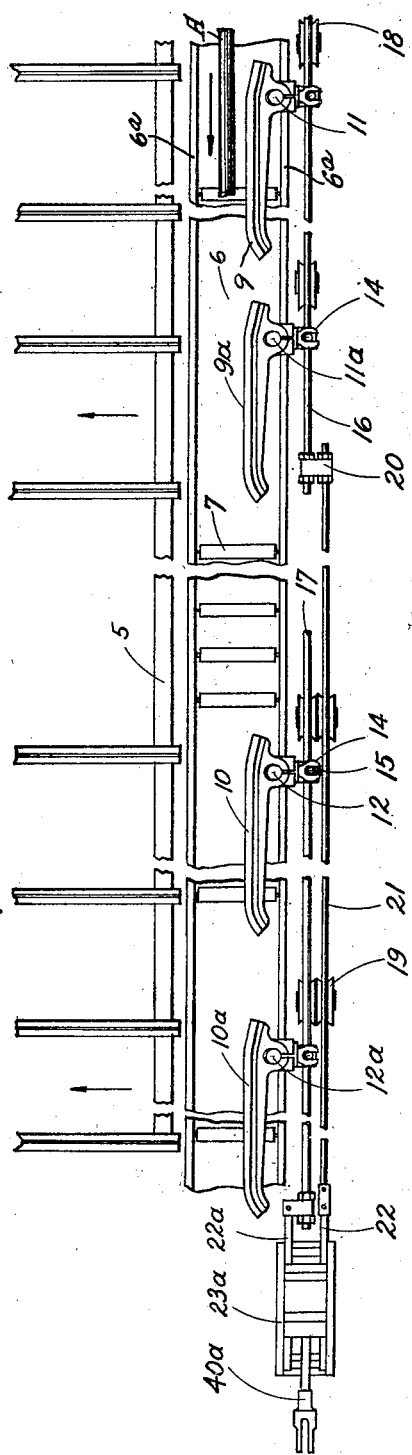
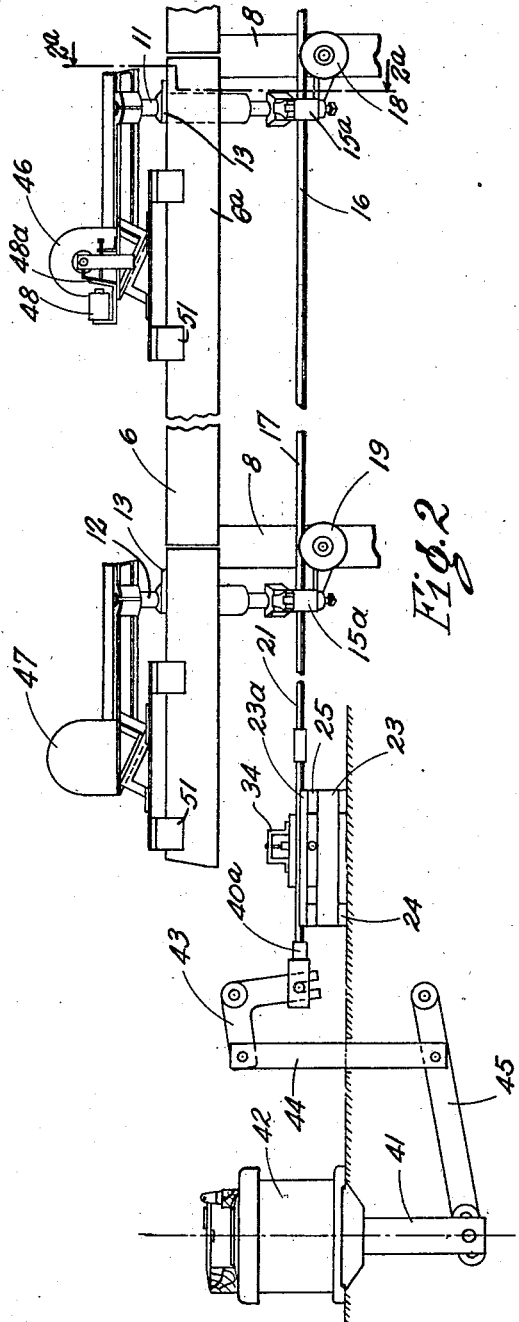
Inventors
JAMES J. BARTON
AUGUSTUS G. CLOUSE
Richey & Watts
Attorneys

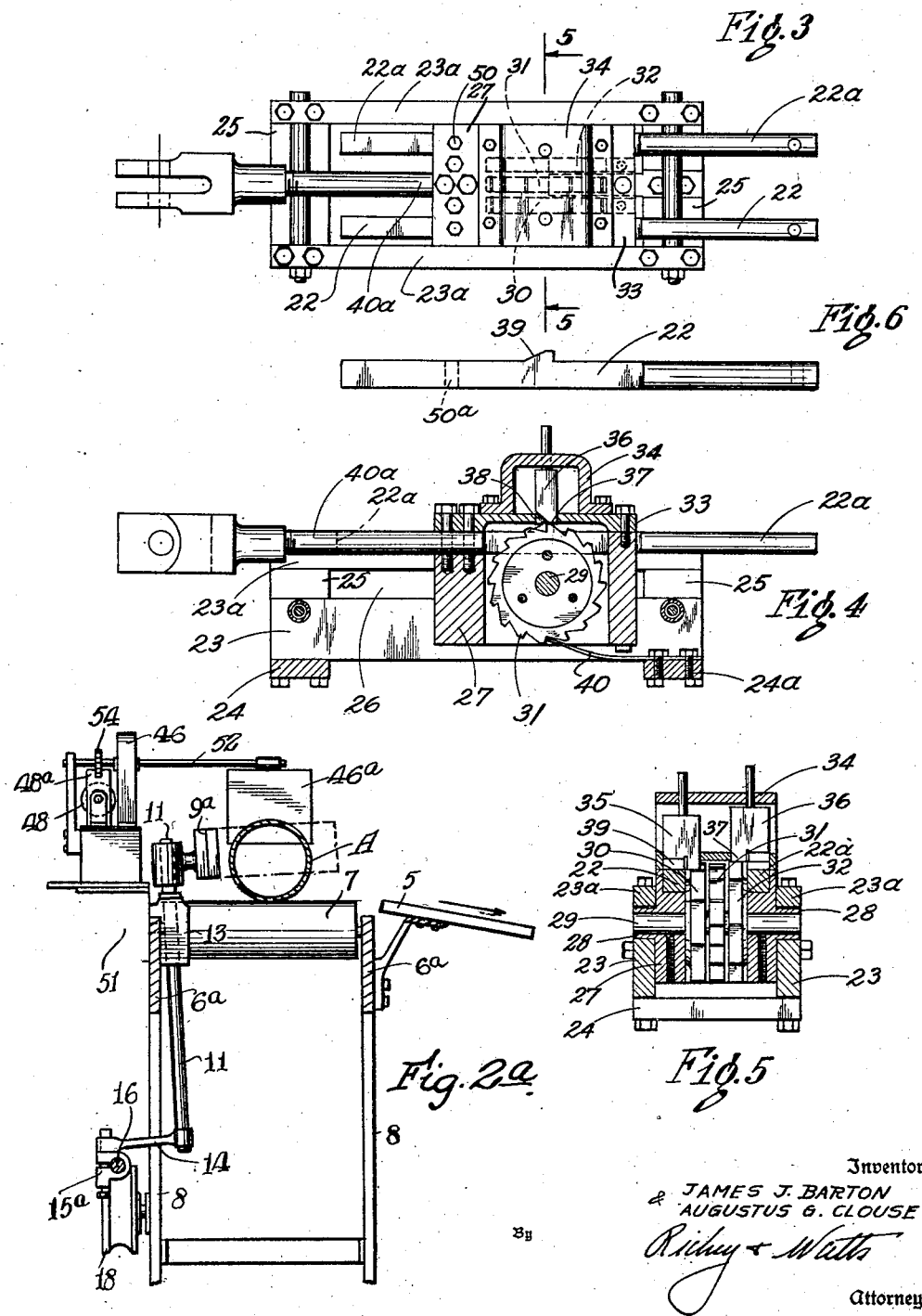

Oct. 13, 1936.  J. J. BARTON ET AL  2,057,131
AUTOMATIC KICK-OFF DEVICE
Filed Jan. 6, 1934   3 Sheets-Sheet 3
*Fig. 7*
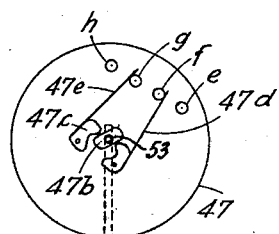
*Fig. 7a*
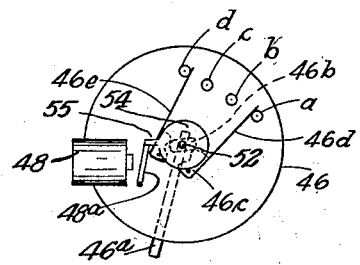
*Fig. 7b*
Inventors
JAMES J. BARTON
& AUGUSTUS G. CLOUSE
By
Richey & Watts
Attorneys Patented Oct. 13, 1936

2,057,131

UNITED STATES PATENT OFFICE 2,057,131

AUTOMATIC KICK-OFF DEVICE

James J. Barton, Youngstown, Ohio, and Augustus C. Clouse, Butler, Pa., assignors to The Fretz-Moon Tube Company, Inc., Butler, Pa., a corporation of Pennsylvania Application January 6, 1934, Serial No. 705,586

17 Claims. (Cl. 198—21)

This invention relates broadly to apparatus for discharging moving articles from a conveyor, and more particularly for discharging pipe, tubes, bars or similar articles from a conveyor on which they move longitudinally, to a cooling table or conveyor upon which the articles move laterally.

More specifically, the invention comprises a plurality of kick-off arms spaced along the conveyor and arranged to be actuated by the moving articles in such a manner that relatively short articles may be discharged alternately at different positions or stations along the length of the conveyor.

The invention also includes a novel article controlled actuating mechanism arranged to alternately operate kick-off arms at different positions along the length of the conveyor. Another feature of this invention is an arrangement to alternately couple a single power means with different kick-off arms so that a single power means may be used to actuate a plurality of arms.

The invention is particularly adapted for discharging lengths of pipe from a conveyor onto a cooling table at spaced points along the length of the table, so that the entire length or capacity of a table constructed for the maximum length of pipe may also be used and maximum efficiency of the cooling table may be obtained when used with shorter lengths of pipe.

Other objects and advantages relating to details of construction and economy of manufacture will be apparent hereinafter.

In the accompanying drawings which illustrate a preferred embodiment of the invention:—

Figure 1 is a fragmentary plan view of a conveyor and cooling table together with kick-off apparatus with the article actuated switches omitted embodying the features of the present invention operatively associated therewith;

Figure 2 is a view in side elevation of Figure 1;

Figure 2a is a partly sectioned end elevation taken on the line 2a—2a of Figure 2.

Figure 3 is a plan view of the alternating mechanism which controls the operation of the kick-off arms shown in Figures 1 and 2;

Figure 4 is a substantially central longitudinal sectional view of Figure 3;

Figure 5 is a transverse sectional view taken substantially on the line 5—5, Figure 3;

Figure 6 is a detail view in side elevation of one of the parts of the alternating assembly shown in Figures 3, 4 and 5;

Figure 7 is a wiring diagram of an electrical circuit which may be used with the apparatus;

Figures 7a and 7b are views in plan and more or less diagrammatic of article actuated switches used in the electrical circuit.

Referring to the drawings in detail, and particularly to Figures 1 and 2, 5 generally designates a cooling table, which may be of any suitable construction but is here shown as the type particularly adapted for pipe, tubes, bars and like elongated stock. Along the receiving side of the cooling table a conveyor, generally indicated at 6 is positioned, having longitudinal side frame members 6a between which are mounted a plurality of conveyor rollers 7 on which the pipe or other stock travels, the conveyor being shown as supported on uprights or frame members 8. The conveyor is arranged to move the pipe A in the direction indicated by the arrows in Figure 1.

A plurality of kick-off arms are arranged at spaced points along the conveyor 6 and are positioned to discharge pipe A laterally from the conveyor rollers 7 onto the cooling table 5. In the embodiment herein illustrated two pairs or sets of such arms 9, 9a and 10, 10a are shown. Each pair or set of arms is arranged to operate together and the two pairs are arranged to operate alternately. It will be understood that any desired number of arms can be included in one set and that any desired number of sets can be spaced along the conveyor.

Suitable means are provided to oscillate the arms to discharge the pipe. In the illustrated embodiment, the kick-off arms 9, 9a and 10, 10a are secured on the upper extremities of shafts 11, 11a and 12, 12a, respectively, said shafts being rotatably mounted in bearings 13 supported by one of the side frame members 6a of the conveyor 6. At their lower extremities the shafts 11, 11a and 12, 12a have adjustably secured thereon lever arms terminating in yokes 14 which straddle pins 15 adjustably secured to connecting rods 16 and 17 by means of clamp blocks 15a. The connecting rod 16 is supported for reciprocatory movement on grooved bearing rollers 18, and the connecting rod 17 is likewise supported on rollers 19. At its forward extremity, the rod 16 is connected by means of an adjustable coupling 20 with the rod 21 which extends parallel with the rod 17.

A single power means, which is shown as a solenoid 42 with a plunger 41, is arranged to pull alternately upon the rods 17 and 21 so as to swing either pair of kick-off arms. As shown herein this alternate coupling of the power means to the rods 17 and 21 is accomplished through an alternating mechanism shown in detail in Figures 3 to 5 inclusive. The forward ends of the rods 21 and 17 are connected respectively to ratchet bars 22 and 22a which are similar in construction and one of which is shown in Figure 6. The plunger 41 of the solenoid 42 is arranged through links 43, 44 and 45 to reciprocate a rod 40a which in turn reciprocates the alternating mechanism and one or the other of the ratchet bars 22 or 22a.

The alternating mechanism shown includes two pairs of vertically spaced guide rails 23 and 23a supported on frame members 24 and 24a and held in spaced relation by spacer blocks 25. Mounted to reciprocate longitudinally between the pairs of guide rails is a housing 27 formed with oppositely projecting sliding blocks 28, each of which engages in one of the slots 26, which are defined by the upper edges of the rails 23 and the lower edges of the rails 23a.

A shaft 29 is journaled in the housing 27 and the ratchet wheels 30, 31 and 32 are mounted on the shaft to rotate as a unit. The central wheel 31 is formed with twice as many teeth as the side wheels 30 and 32. In the present instance, the central wheel 31 is shown with sixteen teeth and the side wheels 30 and 32 with eight teeth. The teeth of all three ratchet wheels face the same way, and the teeth of the side ratchet wheels 30 and 32 are staggered with respect to one another. Half of the teeth of the central ratchet wheel 31 are aligned with the teeth of the side ratchet wheel 30, while the alternate teeth of the central wheel 31 are aligned with the teeth of the wheel 32.

The ratchet bars 22 and 22a are slidably mounted in guideways extending longitudinally along the sides of the housing 27 so that the teeth 39 projecting upwardly from the ratchet bars are disposed adjacent the uppermost teeth of the side ratchet wheels 30 and 32, respectively. A cap 33 is secured to the housing 27 and a guide housing 34 is mounted on the cap 33. Driving keys 35 and 36 are mounted for vertical sliding movement in aligned openings in the cap 33 and the top wall of the housing 34. Each of the driving keys 35 and 36 is provided at its lower end with reversely beveled teeth 37 and 38. The tooth 38 of the key 35 is arranged to engage the upwardly projecting tooth 39 of the ratchet bar 22 so that when the key 35 is in its lower position, movement of the housing 27 to the left, as seen in Figure 3, causes the bar 22 to be reciprocated with the housing. Similarly the tooth 38 of the key 36 is arranged to engage the tooth 39 of the bar 22a so that when the key 36 is lowered and the housing 27 is moved to the left, as seen in Figure 3, the bar 22a will be pulled to the left.

The teeth 37 of the keys 35 and 36 are arranged to coact with the side ratchet wheels 30 and 32 so that the keys 35 and 36 may be alternately lifted or cammed out of engagement with the respective bars 22 and 22a. As shown in Figures 4 and 5, one of the teeth of the wheel 32 is disposed in its uppermost position and is in engagement with the tooth 37 of the key 36 holding the key 36 in a raised position. Since the teeth of the wheels 30 and 32 are staggered with respect to each other in the position shown in Figures 4 and 5 the tooth 37 of the key 35 fits between two adjacent teeth of the wheel 30 allowing the key 35 to assume its lowermost position with its tooth 38 engaged with the tooth 39 of the bar 22. The teeth 37 of the keys 35 and 36 are arranged reversely with respect to the teeth of the side ratchet wheels 30 and 32 so that rotation of the ratchet wheels in a clock-wise direction, as seen in Figure 4, will alternately lift the keys 35 and 36.

When the solenoid 42 is energized the plunger 41 is lifted and the linkage 43, 44 and 45 pulls the rod 40a and the housing 27 to the left as seen in Figures 2, 3 and 4. With the ratchet wheels in the position shown in Figures 4 and 5, the key 35 pulls the bar 22 to the left with the housing 27. When the solenoid circuit is opened the plunger 41 is returned to its lower position by gravity or in any other suitable way causing the carriage 27 to return to the right hand position as shown in Figures 3 and 4.

The central ratchet 31 is successively rotated, preferably the space of one of its teeth, to thereby rotate ratchet wheels 30 and 32 and cause the teeth of the latter to alternately raise the keys 35 and 36 out of engagement with the teeth 39 of the bars 22 and 22a on successive forward strokes of the housing 27 and the assembly carried thereby. To effect such rotation of ratchet wheel 31, a pawl 40, which is here shown as formed of spring steel, is secured at one end to the frame member 24a and has the other end thereof normally in engagement with the teeth of the central ratchet wheel 31. Thus, upon the return movement of the housing 27 to the right the pawl 40 engages the teeth of ratchet wheel 31 and rotates the entire group of ratchet wheels 30, 31 and 32, the ratchet wheels 31 rotating the space of one tooth and wheels 30 and 32 rotating through the space of half a tooth. After one complete reciprocation from the position shown in Figs. 4 and 5 the key 35 will be lifted out of engagement with the tooth 39 of the bar 22, and similarly the key 36 will be lowered into driving engagement with the tooth 39 of the bar 22a.

The solenoid 42 is arranged to be energized by article actuated switches 46 and 47 mounted at suitably spaced points on brackets 51 secured to the outer side member 6a of the conveyor frame. The switches 46 and 47 have shafts 52 and 53 journaled therein projecting laterally over the path of the pipe moving along the conveyor rolls 7. Article engaging trips 46a and 47a secured to the shafts 52 and 53, respectively, normally depend into the path of the pipe moving along the conveyor rolls. Within the housings of the switches, the shafts 52 and 53 carry cams 46b and 47b, respectively. Blocks 46c are pivoted to the housing of switch 46 and are urged by spring pressure toward each other and into engagement with the cam 46b. Contact arms 46d and 46e are secured to the blocks 46c in the switch 46. The trip 46a normally hangs by gravity in a substantially vertical position. In this position the cam 46b is turned so that the spring urging the blocks 46c toward each other holds the contact arm 46d in engagement with the contacts b, b' and the contact arm 46e in engagement with contacts c and c' (see Figure 7). When the trip 46a is swung to the left by engagement of an article therewith into the position shown in Figure 7b the cam 46b carried on the shaft 52 forces the blocks 46c apart and moves the contact arm 46d into engagement with stops a, a' and the contact arm 46e into engagement with the contacts d, d'.

Similarly contact arms 47d and 47e are secured to the blocks 47c pivotally mounted within the switch 47. When the trip 47a is hanging by gravity in a substantially vertical position as indicated in Figure 7a, the blocks 47c are spring pressed toward each other so that the contact arm 47d engages the contacts f, f' and the contact arm 47e engages the stops g, g'. When the trip 47a is swung to the left by engagement with a moving article on the conveyor the cam 47b moves the arms 47d and 47e so that the contact arm 47d is in engagement with the contacts e and e' and the contact arm 47e is in engagement with the contacts h and h'.

A disc 54 is secured to the shaft 52 of the switch 46 and is formed with a projecting lug 55. A magnet 48 is supported by the bracket 51 which carries the switch 46 and is arranged to actuate a member 48a which is also pivoted to the bracket and normally held by spring tension spaced from the magnet 48. The upper end of the member 48a is arranged to engage under the lug 55 on the disc 54 when the shaft has been rotated to the position shown in Figure 7b, in such a manner as to prevent the trip 46a from returning to its vertical position. Energization of the magnet 48 moves the member 48a to the left so as to release the lug 55 and allow the trip 46a to again return to its vertical position.

Electrical connections are provided such that when a pipe strikes the trip 46a the solenoid 42 is energized to swing the arms 9, 9a and discharge the pipe from the conveyor after which the circuit is broken leaving the switch 46 latched in the position to which it was turned by the pipe. The next pipe strikes the trip 47a again energizing the solenoid 42 and actuating the arms 10, 10a to discharge the tube after which the circuits are restored to their original position.

To accomplish this, two relays 49, 49a are provided together with a circuit breaker 45a associated with the solenoid 42, which normally remains closed and is opened momentarily by the plunger 41 of the solenoid 42 when the plunger reaches its raised position.

An arrangement of the wires for carrying out this operation is illustrated in Figure 7. One side $l$ of the main line is connected through the wire $k$, the circuit breaker 45a and the line $i$ to one side of the coils of each of the relays 49, 49a. The line $l$ is also connected to one end of the windings of the solenoid 42 through line $k'$ and directly connected to the contact $e'$ of the switch 47 through line $s$. The other side $r$ of the main line is connected to one of the contacts 55 and 55a of each of the relays 49, 49a, respectively, to one side of the coil of the solenoid 48 through line $w$ and to the contact $c$ of the switch 46 through line $x$.

When the operation of the apparatus is started the current is turned on and a circuit is completed from the line $r$ through the line $x$ through the contacts $c$ and $c'$ to the line $j$ and thence directly to the open side of the coil of the relay 49 through the lines $u$ and $y$, the other side of which coil is connected by the line $i$ through the circuit breaker 45a to the line $l$. This energizes the relay 49 and holds its contacts 55 and 56 closed so that the line $r$ is connected through said contacts through the line $u$ and line $t$ to the contact $h'$ in the switch 47 and through line $u$ and $j$ to the contacts $c'$ and $d'$ in the switch 46. Current from line $r$ is available at these contacts $h'$ and $d'$ whenever the contacts 55 and 56 are closed. It will be noted that a circuit through the coil of the relay 49 is also completed through the contacts 55 and 56 of that relay and the line $y$ so that when the relay contacts 55 and 56 have been closed by current passing through the contacts $c$ and $c'$ of the switch 46 they remain closed until the current to the coil of the relay 49 from the line $l$ is interrupted by the circuit breaker 45a.

The first pipe advancing on the conveyor rolls 7 strikes the trip 46a and turns the shaft 52 and the cam 46b so that the contact arms 46d and 46e move apart into engagement with the stops $a$, $a'$ and contacts $d$, $d'$, respectively. In this movement the circuit through the contact $c$ and $c'$ is broken but the relay 49 nevertheless remains closed by reason of the connection of the coil to the line $r$ through the line $y$ and relay contacts. The contact arm 46e closes a circuit across the contacts $d$ and $d'$ so that current from the contact $d'$ which has passed through the contacts 55 and 56 of relay 49, passes through the line $m$, the line $n$, across the contacts $f'$ and $f$ and through the lines $o$ and $p$ to one side of the coil of relay 49a, the other side of which is directly connected to the line $l$ through the circuit breaker 45a. The contacts 55a and 56a of relay 49a are thereby closed and current flows directly from the line $r$ through these contacts to line $z$, the coil of the solenoid 42, the other side of which is connected through line $k'$ to the line $l$ thereby energizing the solenoid. The actuation of the solenoid swings the kick-off arms 9 and 9a and discharges the pipe. However, the trip 46a is not allowed to return to its vertical position because of the engagement of the latch 48a with the lug 55 which holds the switch 47 in the position shown in Figure 7b.

As the plunger 41 of the solenoid 42 reaches the top of its stroke it strikes the circuit breaker 45a and opens the circuit between the line $l$ and the two relays 49 and 49a. The opening of the contacts 55a and 56a of the relay 49a breaks the circuit through the solenoid 42 and allows the plunger 41 to drop back to its lower position. Likewise breaking the circuit from the line $l$ opens the contacts of the relay 49. When the plunger 41 drops, the circuit breaker 45a again closes but the relay 49 remains open because the circuit across the contact $c$ and $c'$ in the switch 46 remains broken.

The next pipe moving along the conveyor rolls 7 strikes the trip 47a and spreads the contact arms 47d and 47e into engagement with the contacts $e$, $e'$ and $h$, $h'$ respectively. The contact 47d closes a circuit from line $l$ through line $s$ across the contacts $e'$, $e$ to the coil of the magnet 48, the other side of which is connected directly to the line $r$ through the line $w$. Energization of the magnet 48 pulls the latch 48a from the lug 55, allowing the trip 46a to swing back by gravity to its vertical position, the end of the pipe having passed beyond the trip 46a. The contact arm 46e then closes the circuit across the contacts $c$ and $c'$ through the lines $j$, $u$ and $y$ to the coil of the relay 49, the other side of which is connected through the line $i$, and circuit breaker 45a to the line $l$. This closes the contacts 55 and 56 of the relay 49. Current through the contacts 55 and 56 of the relay 49 then flows through the line $u$ and line $t$ across the contacts $h$, $h'$, which are connected by the contact arm 47e, through the lines $s$, $m$ and $n$ and then across the contacts $b$, $b'$ which are closed by the contact arm 46d, and then through the line $p$ to the open side of the coil of the relay 49a, closing the contacts 55a and 56a of this relay and thereby energizing the solenoid 42. Energizing of the solenoid 42 again lifts the plunger 41 which swings the arms 10 and 10a and discharges the pipe. At the top of its stroke the plunger 41 against opens the circuit breaker 45a which breaks the circuit to the relays 49 and 49a opening the contacts 55a and 56a of the relay 49a and permitting the plunger to return by gravity to its lower position. When the pipe is discharged by the arms 10 and 10a the trip 47a is immediately released so that the contact arms 47d and 47e return to the position shown in Figure 7a, breaking the circuit across the contacts h and h' and thereby preventing re-energizing of the relay 49a when the circuit breaker 45a closes. The cycle is thus completed and the parts restored to their original position with the circuit across the contacts c and c' closed by the contact arm 46e so that the relay 49 is energized, its contacts 55 and 56 closed, and the apparatus is ready for the next pipe which will again be discharged by the arms 9 and 9a.

Suitable means are provided to return the kick-off arms to their normal position out of the path of the tube moving along the conveyor. In the installation here shown, the kick-off arms and bearing pins or shafts thereof are set at an angle of inclination such that the said arms will swing or move by gravity back to normal position. Thus when the plunger 41 of the solenoid 42 drops by gravity the housing 27 will be pushed to the right and the bar 22 or 22a will be pulled back to the right by the gravitational return movement of the kick-off arms 9, 9a or 10. 10a.

By referring to Fig. 3, it will be noted that the top of the housing 27 at the rear extremity thereof is provided with holes 50 which are adapted to register with holes 50a formed in the bars 22 and 22a when said bars are in transversely aligned position. These holes are adapted to receive pins or the like, not shown for connecting the reciprocating housing 27 with both the bars 22 and 22a so that the kick-off arms 9, 9a and 10, 10a may be operated in unison by locking the trip 46a out of the path of the tubes with the contact arms 46d and 46e in engagement with the contacts b, b' and c, c', respectively. Thus means are provided for easily and quickly converting the mechanism into the conventional type of kick-off apparatus.

While the invention has been described as being used for transferring pipe lengths to a cooling table in a welding mill, it will be understood that it could be applied with equal advantage to various other types of articles, such for example as rods or bars and the like. It will also be understood that changes and variations in structure may be adopted within the scope of the invention as defined by the appended claims.

We claim:

1. In a conveyor system, separate sets of movable members arranged in spaced relation with respect to one another along a conveyor for discharging articles from the conveyor, a single power means including means rendered operable through contact with the article being conveyed for actuating said members, and means for operatively connecting said actuating means alternately with each set of said members.

2. In a conveyor system, separate sets of movable members arranged in spaced relation with respect to one another for effecting discharge of articles from a conveyor, a prime mover for actuating said separate sets of movable members, means rendered operative through contact with the articles being conveyed for energizing said prime mover, and means for alternately operatively connecting said prime mover with each set of said movable discharge members to effect alternate discharge movement of the latter.

3. In a conveyor system, separate sets of movable members arranged in spaced relation with respect to one another for discharging articles from a conveyor, an electrical prime mover for actuating said sets of members, an electrical circuit, switches disposed in the path of the articles being conveyed for closing the circuit and energizing said electrical prime mover, and means for alternately operatively connecting said prime mover with each set of said discharge members to effect alternate discharge movement of the latter.

4. In a conveyor system particularly adapted for tubes, bar and like elongated articles, a conveyor, separate sets of movable kick-off arms arranged in spaced relation with respect to one another along the conveyor, a prime mover for effecting movement of said sets of arms to discharge articles from the conveyor, means rendered operative through contact with the articles being conveyed for energizing said prime mover, and means interposed between said prime mover and said arms for alternately operatively connecting the prime mover with each set of the arms to effect alternate discharge movement of the latter.

5. In a conveyor system particularly adapted for tubes, bars and like elongated articles, a conveyor, a pair of movable kick-off arms arranged in spaced relation with respect to one another along the conveyor, an electrical prime mover for actuating said pair of arms, an electrical circuit, switch members disposed in the path of the articles being conveyed for closing the circuit and energizing said prime mover, and means for alternately connecting said prime mover with each of said kick-off arms to effect alternate discharge movement of the latter.

6. In a conveyor system, a conveyor, separate sets of kick-off arms arranged in alignment along the length of the conveyor, a solenoid for actuating said arms, an electrical circuit, switch members disposed in the path of the articles being conveyed for closing said circuit and energizing said solenoid, and means for operatively connecting said solenoid alternately with each of the sets of said arms.

7. In a conveyor system, a conveyor, a pair of movable members arranged in spaced relation with respect to one another along the length of the conveyor for discharging articles from the conveyor, a solenoid for actuating said members, switches disposed in the path of the articles being conveyed, an electrical circuit connecting said switches with said solenoid, linkage mechanism connecting said solenoid with said discharge members, and means associated with said linkage mechanism for alternating the connection of the solenoid with respect to said discharge members to effect alternate discharge movement of the latter.

8. In a conveyor system, a conveyor, a pair of movable discharge members arranged in spaced relation with respect to one another along the length of the conveyor for discharging articles from the conveyor, a solenoid for actuating said members, switches disposed in the path of the articles being conveyed, an electrical circuit connecting said switches with said solenoid, said switches being closed through contact with the articles being conveyed to thereby close the circuit and energize the solenoid, means for holding the leading switch clear of each alternate article to permit the latter to pass through to the following switch, and means for alternately operatively connecting said solenoid with said discharge members to effect alternate discharge movement of the latter.

9. In a conveyor system, a conveyor, a pair of movable members arranged in spaced relation with respect to one another along the length of the conveyor for discharging articles from the conveyor, an electrical prime mover for said members, an electrical circuit, switches disposed in the path of the articles being conveyed for closing the circuit and energizing said prime mover, linkage mechanism connecting said prime mover with said members, said linkage mechanism including two rack bars which are separately connected to said discharge members and are also operatively connected to said prime mover, a plurality of ratchet wheels, two of said wheels having a like number of teeth and the remaining wheel having twice such number, pawls each having a tooth adapted to engage one said rack bars and a reversely sloped tooth adapted to engage the ratchet wheels having a like number of teeth, and means for rotating said ratchet wheels at each stroke of said prime mover to alternately release said pawls from said rack bar and thereby effect alternate actuation of said discharge members.

10. In a conveyor system, a conveyor, a pair of movable members disposed in spaced longitudinal alignment along the length of the conveyor for discharging articles from the conveyor, an electrical prime mover for said members, an electrical circuit, switches disposed in the path of the articles being conveyed for closing the circuit and energizing said prime mover, linkage mechanism operatively connecting said prime mover with said discharge members, said mechanism including a pair of slidable rack bars, a housing connected to said prime mover and having relative sliding movement with respect to said bars, said bars being separately connected to said discharge members, pawls each having two-way teeth mounted in said housing, three ratchet wheels rotatably mounted in said housing and movable with the latter, one of said ratchet wheels having twice as many teeth as the remaining wheels and each tooth substantially aligning with a tooth of one of said remaining ratchet wheels at the forward stroke of the housing, and a pawl adapted to engage the teeth of the double tooth ratchet wheel to move the first-named pawls alternately clear of engagement with the teeth of the said rack bars to effect alternate connection of said prime mover with said discharge members.

11. In a conveyor system, a conveyor, a pair of movable members arranged in spaced relation along the length of the conveyor for discharging articles from the conveyor, an electrical prime mover for said members, an electrical circuit, switches arranged in alignment in the path of the articles being conveyed for closing the circuit and energizing said electrical prime mover, a latch associated with the leading switch, a magnet associated with said leading switch and adapted to be energized through the operation of the following switch and release said latch, and means for alternately operatively connecting said prime mover with said discharge members to effect alternate discharge movement of the latter.

12. In a conveyor system, a conveyor, a pair of horizontally aligned movable members arranged in spaced relation along the length of the conveyor for discharging articles from the conveyor, a solenoid for actuating said members, an electrical circuit, flag switches disposed in alignment in the path of the articles being conveyed for closing the circuit to the solenoid and energizing the latter, a latch associated with the leading switch for holding the latter clear of an article passing thereunder, a magnet for releasing said latch, linkage mechanism connecting said solenoid with said discharge members, and means interposed in said linkage mechanism for alternating the connection of the solenoid with respect to said discharge members.

13. In a conveyor system, a conveyor, a pair of horizontally aligned kick-off arms associated with the conveyor, a solenoid for actuating said arms, an electrical circuit, flag switches interposed in said circuit and disposed in the path of the articles being conveyed for closing the circuit and energizing the solenoid, a latch associated with the leading switch for holding the latter clear of an article carried by the conveyor, a magnet for releasing said latch, said magnet being energized through closing of the following switch to thereby release the leading switch and permit it to lower to its normal operating position, linkage mechanism operatively connecting said solenoid with said kick-off arms, said linkage mechanism including pawl and ratchet mechanism arranged to alternately connect said solenoid with said kick-off arms to effect alternate movement of the latter.

14. In a conveyor system particularly adapted for tubes, bars and like elongated articles, a pair of horizontally aligned kick-off arms associated with the conveyor for discharging articles therefrom, a solenoid for actuating said arms, an electrical circuit, flag switches interposed in said circuit and disposed in alignment in the path of the articles being conveyed for closing the circuit through contact with the articles and energizing said solenoid, a latch associated with the leading switch for holding the latter clear of said articles, a magnet interposed in the circuit for releasing said latch, said latch magnet being connected with the following flag switch in a manner such as to be energized by the latter and release the leading flag switch and permit it to lower to its normal operating position, and linkage mechanism operatively connecting said solenoid with said kick-off arms, said mechanism including longitudinally extending connecting rods each terminating at one extremity in a toothed rack bar, a slidable housing connected to said solenoid and provided with pawls adapted to engage said rack bars and impart a stroke to said kick-off arms, and means for alternately holding the pawls clear of said rack bars to effect alternate movement of said kick-off arms.

15. In a conveyor system, a conveyor, movable kick-off arms arranged in spaced relation with respect to one another along the length of the conveyor for effecting discharge of articles from the conveyor, a prime mover for actuating said arms, article actuated means for alternately operatively connecting said arms with said prime mover to effect alternate discharge movement of said arms, and means for also connecting said arms with said prime mover to effect unisonal movement of said arms.

16. In a conveyor system, a conveyor, movable kick-off arms arranged in spaced relation with respect to one another along the length of the conveyor for effecting discharge of articles from the conveyor, a prime mover for actuating said arms, linkage mechanism for connecting said arms with said prime mover, article actuated means interposed in said linkage mechanism operating to effect an alternate operative connection of said arms with the prime mover, and means for connecting said arms for unisonal movement by said prime mover.

17. In combination with a conveyor, separate sets of discharge mechanisms for effecting discharge of articles from the conveyor at different points, a single power means for alternately actuating said sets of discharge mechanisms and means actuated by the articles being conveyed for alternately connecting said power means with each of said sets of discharge mechanisms.

JAMES J. BARTON.
AUGUSTUS C. CLOUSE.